United States Patent [19]
Duval et al.

[11] Patent Number: 5,935,229
[45] Date of Patent: Aug. 10, 1999

[54] BIDIRECTIONAL SEQUENTIAL INTERACTION DESIGNATION SCHEME FOR A CHAINED AND BUSSED ARRAY OF INTEGRATED CIRCUITS

[75] Inventors: David R. Duval, Lake Montezuma, Ariz.; Kang Chan, Cerritos, Calif.

[73] Assignee: Xerox Corporation, Stamford, Conn.

[21] Appl. No.: 08/829,709

[22] Filed: Mar. 28, 1997

[51] Int. Cl.[6] .................................................. G06F 13/00
[52] U.S. Cl. ............................ 710/105; 710/31; 370/452
[58] Field of Search ................................... 395/285, 287, 395/851; 370/452, 909, 451

[56] References Cited

U.S. PATENT DOCUMENTS

| | | | |
|---|---|---|---|
| 4,380,063 | 4/1983 | Janson et al. | 370/235 |
| 4,710,915 | 12/1987 | Kitahara | 370/224 |
| 4,941,142 | 7/1990 | Kida | 370/456 |
| 5,388,223 | 2/1995 | Guthrie et al. | 370/448 |
| 5,422,885 | 6/1995 | Nadkarni | 370/451 |
| 5,528,765 | 6/1996 | Milligan | 395/287 |

*Primary Examiner*—Gopal C. Ray
*Attorney, Agent, or Firm*—Robert Cunha

[57] ABSTRACT

A programmable direction control scheme for an efficiently wired array of like integrated circuit chips which is capable of producing a rightward or leftward sequence of designated interaction is described. The member chips are incorporated into a system by connecting their existing addressing, data, and clock pads onto a mutual bus. The chips are additionally chained together by their qualification pads so that they may be individually designated for interaction with the system, by way of sequential token passing. A direction control bit within a programmable configuration register is included on each member chip in lieu of a dedicated input. The configuration register is given free access irrespective of the designation status of its incorporating chip, and thus the direction control bits of all of the member chips of the array may be expediently programmed even when the elsewise process of sequencing through the chips would be paradoxically self obstructed by an initial directional chaos condition. Also described is an additionally facilitated performance mode of operation which allows the above mentioned addressing pads to be transformed into additional data pads so that higher data throughput may be realized without adding pads. Both operational modes mutually share the programmable direction control. Also, the performance mode exercises automatic token passing, and an accessory mode provides for externally commanded token passing. Additionally described is an example usage of such chips within a print-bar application which has two arrays of chips, of which one row is upside down relative to the other.

21 Claims, 9 Drawing Sheets

BIDIRECTIONAL SEQUENTIAL INTERACTION DESIGNATION SCHEME FOR A CHAINED AND BUSSED ARRAY OF INTEGRATED CIRCUITS

BACKGROUND OF THE INVENTION

This invention relates to arrays of integrated circuit chips and methods by which they are electrically connected into and then interacted with by their incorporating systems. More particularly it provides an interaction coordination scheme for a very efficiently wired array of like chips. The scheme uses bidirectional (i.e. rightward versus leftward) sequential designation as a means of interacting with one chip at a time, and also employs means for globally programming the desired sequential direction into all member chips of the array when the sequential designation means are paradoxically self obstructed by an initial "directional chaos" condition.

Many systems require unique data to be written into and read from each of a plurality of like chips. In a typical system where the electrical line count is critical, data and clock terminals (pads) of multiple chips are bussed onto a single set of digital lines and are also chained together in a daisy chain manner. The appropriate chaining logic is designed into each chip and a set of chaining pads—one an input and the other an output—are added to each chip. The chaining output of one chip is connected to the chaining input of the following chip and its chaining output is connected to the chaining input of the following chip and so forth until all of the member chips are serially chained together in this way.

The member chips may be sequentially interacted with (i.e. written to or read from) individually by an operational procedure which is known as token passing. Simple token passing schemes typically use a shift register or ring counter to shift, say, a 1 through a field of 0s where the 1 is used to select elements one at a time. (this is not to be confused with "token ring" schemes). In the present context, the above mentioned chaining logic of a chain of like chips forms a manifest shift register or operational equivalent, which spans across the chain of chips. Multiple internal token passing stages may or may not be designed into each chip.

When a specification exists for chips of a particular design to have the capability of operating within a bussed array in which they must be interacted with sequentially using, say, a rightward progression, and for chips of the same design to also be capable of operating within an array which requires a leftward sequential progression, bidirectional token passing means would expectedly be used. Direction control logic and a dedicated (i.e., single purpose) direction control input would typically be added to each chip. Such logic, responsive to the applied logic level of the direction control input, would simultaneously change the I/O modes of both chaining pads so that output becomes input, and input becomes output. Such a chip could be used within applications which require sequentially designated interaction to progress in either direction.

The dedicated direction control inputs of such member chips of a "chained and bussed" array could then be strapped to digital power within an array which requires that the chips be interacted with sequentially in one direction, or to digital ground within an array which requires sequential progression to occur in the opposite direction. An alternative wiring method would be to buss these direction control inputs to a direction control line which would be run to the control sector of the incorporating system. The system could then command a reversal of the token passing direction at any time.

The above stated direction control means objectionably adds one more pad to each member chip, and adds a conductor line to an array of chips for which the requirement of remotely dictated reversibility of its token passing direction exists.

One place where a bidirectional sequentially coordinated chip interaction requirement exists is in a chained and bussed array of light emitting diode (LED) driver chips on a LED print-bar in a printer. The stated scheme of adding dedicated direction control inputs and a direction control line is objectionable on a print-bar however, because pad and electrical conductor line quantities are extremely critical for size and cost reasons.

When consideration is given to the addition of an on-chip direction control storage element (e.g. latch or flip-flop) which would be programmable via the address and data bus—as an alternative to the addition of a dedicated direction control input—a paradox becomes apparent; any attempt to sequence through an array of chips, for the purpose of initially programming their direction control storage element, would be obstructed by an ensuing directional chaos condition which would be realized after powering up the array. This is because the logic state of the direction control element of each member chip would be unpredictable and hence conflict between the chips would be expected. The direction control elements can not be programmed because they had not yet been programmed (a self obstructing predicament).

One expected design solution which might be applied to the programmable direction control concept for the purpose of precluding the stated programming paradox, would be to additionally include on-chip power-up initialization circuits which would initially set the direction control elements of each chip to a predetermined state. Objectionably, this would require the addition of more extensive logic in order to facilitate the contradictory and cumbersome process of sequencing through an array of chips in the default direction, for the purpose of programming them to normally sequence in the opposite direction. It would also require the addition of an on-chip RC circuit.

What is needed is token passing direction control means for a chained and bussed array of like chips which does not require the addition of any more pads or extensive logic or RC circuits to each LED driver chip, or add more electrical conductor lines to a print-bar.

SUMMARY OF THE INVENTION

This invention, firstly, facilitates the token passing direction control of a chain of like chips whose address, data, and clock pads are bussed onto a single set of conductor lines by adding, to each chip, a configuration register which contains a direction control bit. Secondly, it provides resolution to the paradoxical predicament realized by the inability to program the direction control element when it had not yet been programmed, by providing such a configuration register with free access means which give it the unique ability of unconditionally recognizing and responding when its address code is applied to the address inputs of the chip. The resulting unconditional response to an asserted configuration write operation causes any such equipped chip to freely accept new configuration data into its configuration register without regard to the designation status of the chip, as would otherwise be compositely determined by the token passing chain. Each of the other registers which exists on a chip only responds to a properly asserted write or read operation when its incorporating chip is designated for interaction by the token passing chain.

Within a chained and bussed array of such chips therefore, each will always recognize an asserted configuration write operation, and thus all of the member chips of the array will simultaneously accept the new configuration data into their configuration registers. This global response to an asserted configuration write operation thus becomes an expedient for specifying the direction of sequential interaction when the array of chips are initially in directional chaos; the chaotic condition thus being vanquished. All of the other registers which exist within an entire array of such chips may subsequently be harmoniously written to or read from, one at a time.

The advantage of having an internally stored direction control which can be reliably programmed on all member chips of an array, is the elimination of a need for dedicated direction control pads and an associated conductor line. An additional advantage is that all of the bits which are contained within the configuration register of all member chips of such an array may be simultaneously programmed to identical states. It must be noted that the control bits which are designed into such an freely responsive configuration register, so that they may be expeditiously programmed, are restricted to the control of functions which are always to be programmed identically within all of the member chips of an array.

Additionally, what is taught is how this invention is utilized within chips which have two different modes of interaction. Firstly, a performance mode, in which a set of interaction pads serve exclusively as data inputs (for high data throughput), and where token passing occurs automatically as dictated by internal events; and secondly, an accessory mode where the same set of interaction pads serve secondary functions which accommodate the addressing of randomly addressable registers. When in the accessory mode, token passing may be remotely and judiciously commanded via the secondary addressing functions of the interaction pad set. The configuration register is programmed via the accessory mode and its direction control bit subsequently serves both interactive modes.

Also, on-chip means are included for preventing self-destruction due to the expected I/O contention of the qualification pads during the stated directional chaos condition which would exist prior to asserting a global configuration write operation. These means preserve token passing propagation speed by utilizing strong drive for fast transitioning to the logic level exerted by a chip which is passing the designation token to its successor chip, and weak drive when the token passing chain is restarted and all of the qualification pads of the entire array simultaneously transition to the opposite level.

DETAILED DESCRIPTION OF THE INVENTION

Figure 1:
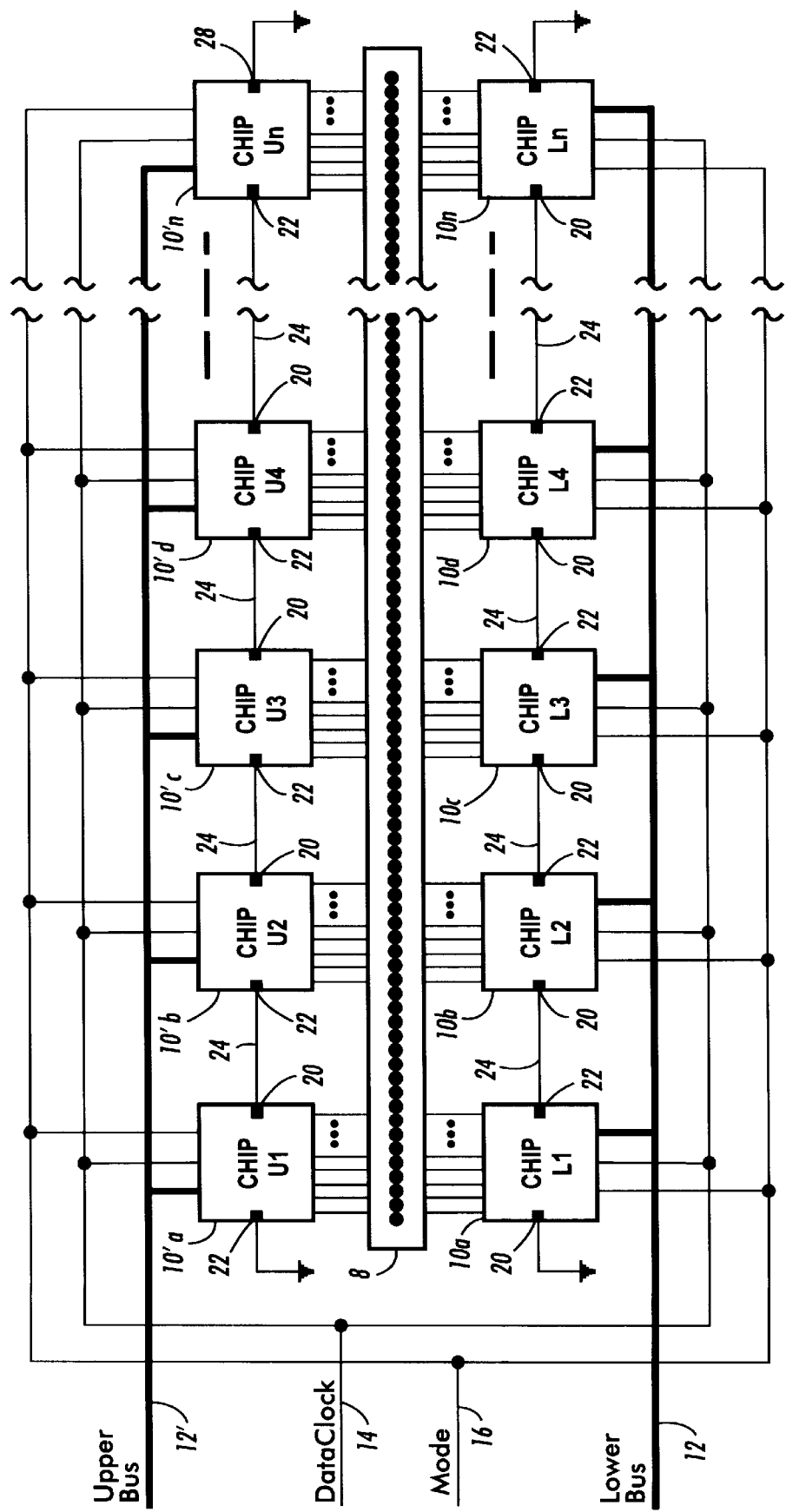
FIG. 1 is a simplified block diagram of a LED print-bar which includes two separate chained and bussed arrays of LED driver chips, of which one array of chips is upside down with respect to the other.

This invention is a bidirectional sequentially coordinated interaction scheme for an efficiently wired array of integrated circuit chips. FIG. 1 illustrates in simplified block diagram form, a basic arrangement of a LED print-bar. A long subassembly of finely placed LEDs 8 has the cathodes of all of its LEDs connected to ground (not shown). The anodes of its LEDs are connected to bonding pads (not shown)—half of which are located on the lower side of the LED subassembly 8, and half of which are located on the upper side of the LED subassembly 8—such that the LEDs are interleaved.

Two chained and bussed arrays of LED driver chips (hereinafter referred to as "chips"), 10a through 10n, and 10'a through 10'n are located in two separate rows which are respectively below and above the LED subassembly 8. The lower array of chips, 10a through 10n, source and pulse electrical current to each of a plurality of LEDs via the anode connection pads which are located at the lower side of the LED subassembly 8. Likewise, the upper array of chips, 10'a through 10'n, source and pulse electrical current to the other half of LEDs via the anode connection pads which are located at the upper side of the LED subassembly 8. Note that the upper array of chips 10'a through 10'n are upside down with respect to the lower array 10a through 10n. This is a critical detail, and is done so that the bonding wires may be connected point to point in the shortest and most direct path possible. All of the LED driver chips of this depicted print-bar are of identical design and this is highly desirable for logistical reasons.

Both arrays are connected to a mutual DataClock line 14, and to a mutual Mode control line 16 via bonding pads which are not shown. The chips of the lower array are bussed to the lower bus 12, while the chips of the upper array are bussed to the upper bus 12', also via bonding pads which are not shown. Each chip has a left qualification pad 20 and a right qualification pad 22. Chips 10a–10n are chained together by connecting the right qualification pad 22 of each chip to the left qualification pad 20 of the chip which is to its right via a bonding wire 24. The left qualification pad of the leftmost chip 10a and the right qualification pad of the rightmost chip 10n are connected to ground. It can be seen that chips 10'a–10'n are also chained together in exactly the same way, but that the chip which is to the right of a particular chip from its own perspective, appears to be to its left from the print-bar perspective.

Within this print-bar context, it is imperative that the concurrent writing of video data into both arrays of chips be laterally coordinated. This is to say that the data must enter one chip of each array at the same time, and that the chip pair which is concurrently written must be physically opposing (i.e. same column). As an example, video data would be simultaneously written into Chip L1 10a and Chip U1 10'a. When that chip pair is filled with video data, designation tokens are simultaneously passed from that pair to chip pair L2 10b and U2 10'b, which would then simultaneously receive subsequent video data. These events would continue until, finally, chip pair Ln 10n and Un 10'n are filled with video data.

While the direction of the sequence of interaction demonstrated by this example progresses in a rightward direction for both arrays from the print-bar perspective, it must be noted that from the perspective of the chips of the upper array, the same example sequence progresses in a leftward direction. The usefulness of having like chips which can pass an interaction designation token in either direction becomes apparent when realized within the context of a system which must concurrently interact with two laterally coordinated rows of such arrayed chips, of which one row is upside down relative to the other.

This capability is achieved by programming the internal token passing direction control of each chip of the upper array to the opposite state of that which they are programmed to in the lower array. An additional acquired advantage is that both arrays may be reprogrammed so that the sequence of concurrent interaction begins with chip pair Ln 10n and Un 10'n and progresses in a leftward direction from the print-bar perspective.

Figure 2:
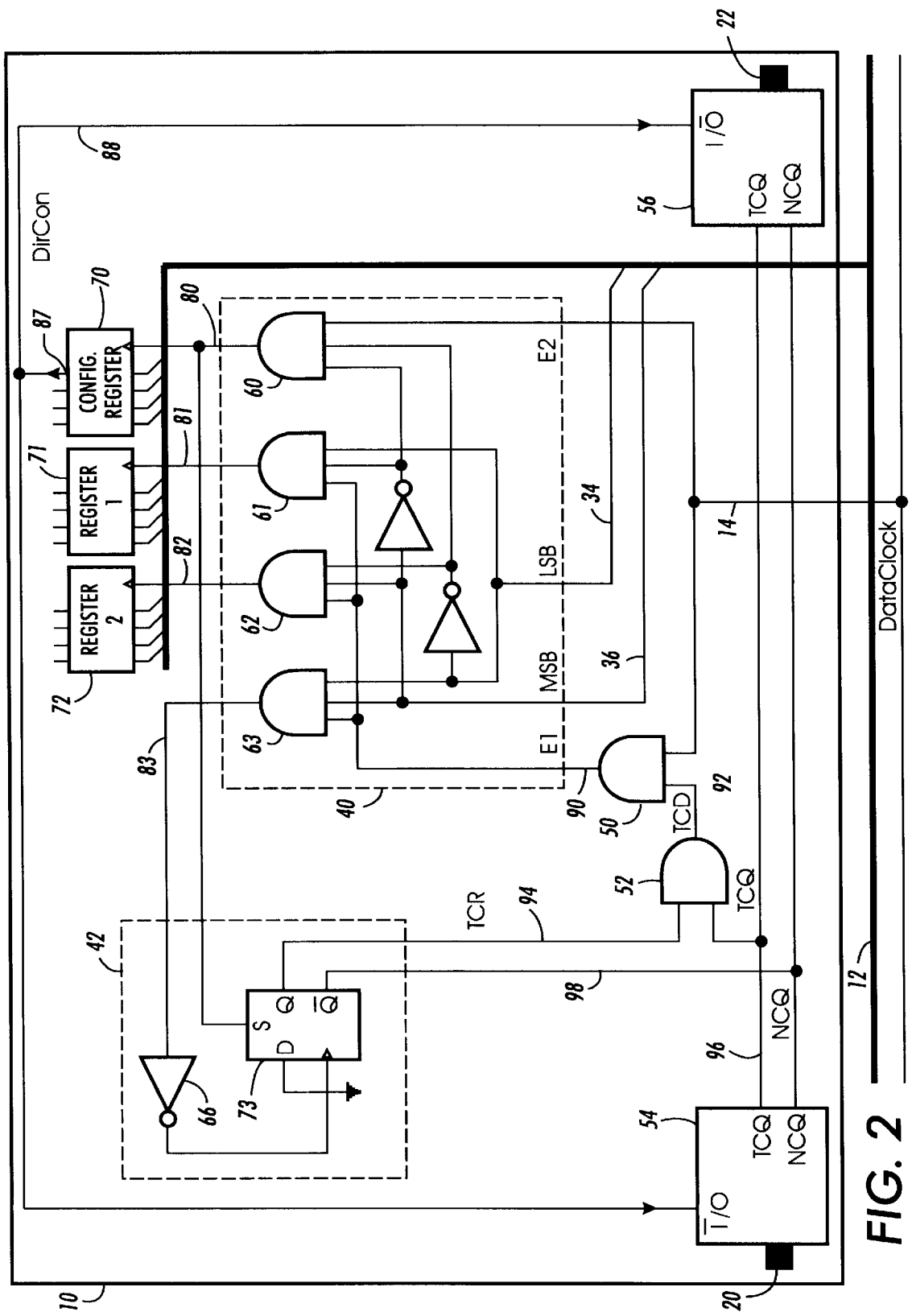
FIG. 2 is a logic diagram of an example chip which incorporates the simplest embodiment of this invention.

FIG. 2 is a simplified logic diagram of a single chip 10 which is connected to a bus 12 and to a DataClock line 14 via bonding pads which are not shown. Pad buffer circuits are excluded for simplicity of example. This example chip incorporates the simplest embodiment of the invention. The depicted chip includes three registers: one labeled configuration register 70, and two others labeled register 1 71 and register 2 72. One of the outputs 87 of the configuration register drives a direction control node 88 which is labeled DIRCON. Connections to the other outputs of these registers are not shown because the functions which they can perform go beyond the scope of this invention. Endless possibilities for such register outputs might be realized within various chip designs.

The logic circuit depicted within the dotted line enclosure 40 is basically a typical 1-of-4 digital decoder which has been slightly modified. Whereas a typical decoder would have a single "write enable" input, the depicted decoder has two write enable inputs. One of the write enables inputs (E1), which is a constituent of electrical node 90, serves as the enable input for the three leftmost AND-gates 63, 62, and 61 of this decoder 40. The other write enable (E2), which can be seen to be a constituent of the DataClock 14, serves as the enable input for the single rightmost AND-gate 60. The three rightmost outputs of the decoder which are constituents respectively of nodes 82, 81, and 80 are connected to the clock inputs of the three registers. The leftmost decoder output is a constituent of node 83, which enters the chip readiness logic block which is depicted within the dotted enclosure 42. The most significant input bit (MSB) of the decoder 40 is a constituent of addressing node 36, and the least significant bit (LSB) is a constituent of addressing node 34. Both of these addressing nodes are shown as being part of the bus 12.

It will be readily understood by anyone skilled in the art, in view of this embodiment, that when a binarily encoded value of 0 is applied to the two addressing inputs via nodes 36 and 34, and then a high pulse is applied to the active high DataClock line 14; the output of the rightmost AND-gate 60 will, via node 80, clock the configuration register 70, which will thus be written with whatever data is currently residing on the bus 12. It will also be understood that this write operation will be freely permitted, since it can be seen that no other logic node which is depicted in this embodiment has any determinance over the operation. Hence the configuration register may be referred to as a "free access" element.

The described configuration write operation establishes the desired token passing direction of this chip by programming the direction control bit within the configuration register to the logic level specified by a corresponding line of the bus 12. The output of the direction control bit 87 drives the DIRCON (direction control) node 88, which also constitutes the I/O control inputs of both of the qualification pad circuit blocks 54 and 56. The other three data inputs of this example chip will have been used at the same time to specify the logic state of any other internal control functions which are to be programmed into their respective configuration register locations.

Note that when an asserted write operation can freely access and affect an element of such a chip, as explained above, it will have a global effect upon that element of all like chips within a chained and bussed array; because they will all, understandably, be simultaneously and identically affected. Elements of the chips which are to be uniquely administered, must be operationally isolated from identical elements of the other chips. Each chip must, therefore, facilitate a mutually isolated independent access to these elements, so that asserted interactions may be targeted to each of those elements, one chip at a time. Descriptions of interactions with "independent access" elements follow.

When a binarily encoded value of 1 is applied to the two addressing inputs 36 and 34 and the DataClock 14 is pulsed high, AND-gate 61 will pass the pulse to register 1 71 via node 81, but only if E1 90 pulses. The TCD node 92 must therefore be at a high logic level (This Chip Designated= true) in order to allow the writing of data into register 1 71, because only then will AND-gate 50 allow the pulse on the DataClock 14 to pass through to E1 90. It can also be seen that this also applies to the writing of register 2 72. Because interactions with these two example elements, via their respective target addresses, is contingent upon the designation status of the chip, as determined by the logic level of the TCD node 92, these are thus independent access elements. Likewise, target address 3 is independently accessible, and is used to clock flip-flop 73 via inverter 66.

Both the TCQ node 96 and the TCR node 94 have determinance over the TCD node 92 by way of AND-gate 52. When the TCQ node 96 is high (This Chip Qualified= true) and the TCR node 94 is high (This Chip Ready=true), the TCD node 92 is driven high and the designation status of the chip is true.

The TCQ node 96 also constitutes one three-state TCQ output each, of both the left qualification pad circuit 54 and the right qualification pad circuit 56. Assuming that the direction control had been programmed to a low logic level, the DIRCON node 88, via its constituent I-bar/O control input to the left qualification pad circuit 54, establishes that the left qualification pad 20 has determinance over the TCQ node 96 such that it will be driven to a logic level which is representative of the logic level which is being externally applied to the left qualification pad 20. At the same time an I/0-bar input of the right qualification pad circuit 56, which is also a constituent of the DIRCON node 88, establishes that the right qualification pad 22 has no effect upon the TCQ node 96, by putting its constituent TCQ output into a high impedance state. In this way, the left qualification pad 20 is serving as the acting qualification input.

The same qualification pad circuit control inputs—I-bar/O and I/O-bar—which are constituents of the DIRCON node 88 cause the NCQ input of left qualification pad circuit, which is a constituent of the NCQ (Next Chip Qualified) node 98, to have no effect upon the left qualification pad 20, while establishing the determinance of the NCQ node 98 over the right qualification pad 22, via the constituent NCQ input of the right qualification pad circuit, such that the right qualification pad 22 is driven to the logic level which is representative of the level which exists on the NCQ node. The right qualification pad 22 is thus serving as the acting qualification output.

If the DIRCON node 88 is instead programmed to a high logic level, the function of both qualification pad circuits will change so as to cause the right qualification pad to conversely serve as the acting qualification input, and the left qualification pad will serve as the acting qualification output.

The TCR node 96 is driven by the Q output of D-type flip-flop 73, which is a part of the chip readiness block 42. In this example embodiment its S (set) input is connected to the same decode node 80 which directly clocks data into the configuration register 70. The TCR node 94 is thus set to a high logic level whenever the configuration register is written to. Hence, respective of this particular embodiment, the writing and re-writing of the configuration register 70 is also utilized as the method of setting the ready state of the chip to true, as often as required. Hence, to the action of setting the chip readiness flip-flop 73 to the ready state, access is free. The action of simultaneously setting all such member chips of an array to the ready state will hereinafter be referred to as an "array restart."

The D input of flip-flop 73 is connected to digital ground, therefore its false or done state is caused by writing to target address 3. Target address 3 is of independent access, as was previously explained. When this flip-flop 73 is in the done state its Q output drives the TCR node 94 to a low logic level (This Chip Ready=false), which undesignates the chip (This Chip Designated=false) and hence prevents any further interactions with the independent access elements of this chip for as long as the TCR node remains low. Also at this time, the Q-bar output of flip-flop 73 drives the NCQ 98 node to a high level (Next Chip Qualified=true) which causes whichever is the acting output qualification pad 20 or 22 of this chip to change logic level. Actuation of this function as caused by writing to a specific target address, as described, will hereinafter be referred to as a "commanded token pass."

The operational equivalent of a manifest shift register is formed across the span of a chained and bussed array, with the above described designation logic of each chip being seen to perform as a single stage within that span. A commanded token pass can be seen to cause a single shift. Numerous ways of embodying this operational equivalency are possible. The present example is given for clarity of following demonstrations.

Note that the depicted inverter 66 is included, because it is extremely important that the acting qualification output of this particular embodiment change logic level at the trailing edge of the DataClock pulse. Otherwise, an uncontrollable chain reaction or domino effect would quickly occur within a chained and bussed array when the successor chip becomes designated while the DataClock is still high and all of the conditions for a subsequent unwanted token pass come into being in that successor chip and then within the next successor chip and so on.

FIGS. 3 through 7 are a series of representational diagrams which are submitted for the purpose of clearly demonstrating the discretionary interaction capability which an incorporating system has over the operationally isolated elements of an array of like chips which embody the teachings of this invention. As related to FIG. 1, only one of those two arrays is represented here in truncated form (i.e. four chips). These demonstrative descriptions will apply equally to either array. In each of this series of diagrams and descriptions each of four chips 10a, 10b, 10c, 10d are referenced. The left qualification pad 20 and the right qualification pad 22 of the chips are referenced. The depicted internal contents of the chips of these diagrams are equivalent representations of the means and methods which were detailed in the previous example embodiment. This is included for the purpose of promoting a visualization of the contributive effect which relevant internal nodes confer upon the aggregate chip designation condition of an array. The mutual bus and other mutually connected digital lines are not shown in this series of diagrams.

Figure 3:
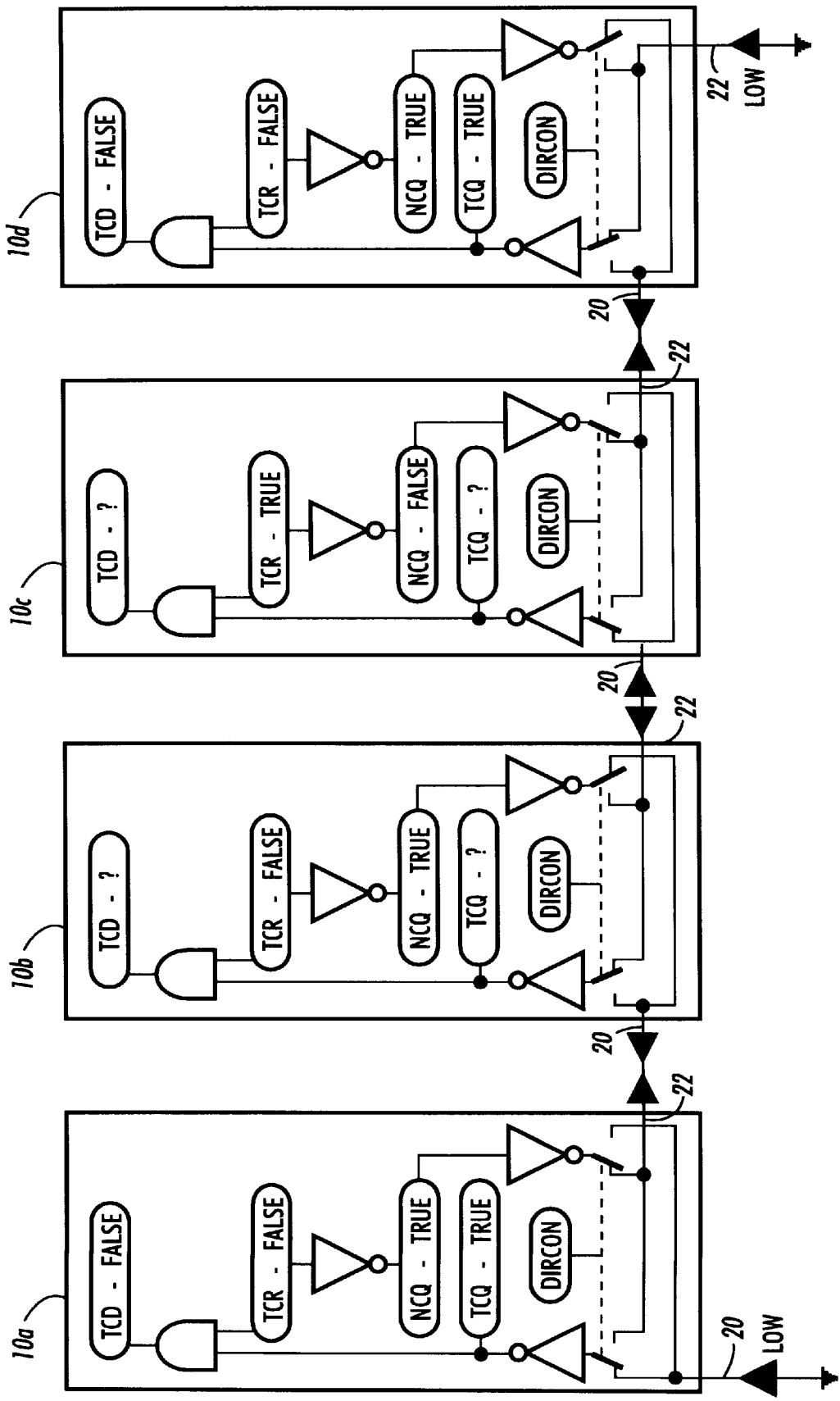
FIGS. 3 through 7 are a series of representational diagrams which depict the aggregate conditions of a chained and bussed array of chips during directional chaos and then through the orderly progression of sequential designation.

FIG. 3 demonstrates an arbitrary example of a directional chaos condition which would be expected when operating power is initially applied to an array of chips. This would be a result of the unpredictability of the initial state of the internal direction control (DIRCON) of each chip. The readiness state (TCR) of the chips are also initially unpredictable. Note that instances of acting qualification output contending with acting qualification output (the right qualification pad 22 of Chip 1 10a vs. the left qualification pad 20 of Chip 2 10b, and also the right qualification pad 22 of Chip 3 10c vs. the left qualification pad 20 of Chip 4 10d) are depicted. An instance of acting qualification input facing acting qualification input (The right qualification pad 22 of Chip 2 10b vs. the left qualification pad 20 of Chip 3 10c) is also depicted. The direction controls of these chips would not be programmable by sequentially designated interaction means at this time, because those means would be self obstructed by the chaotic condition.

Figure 4:
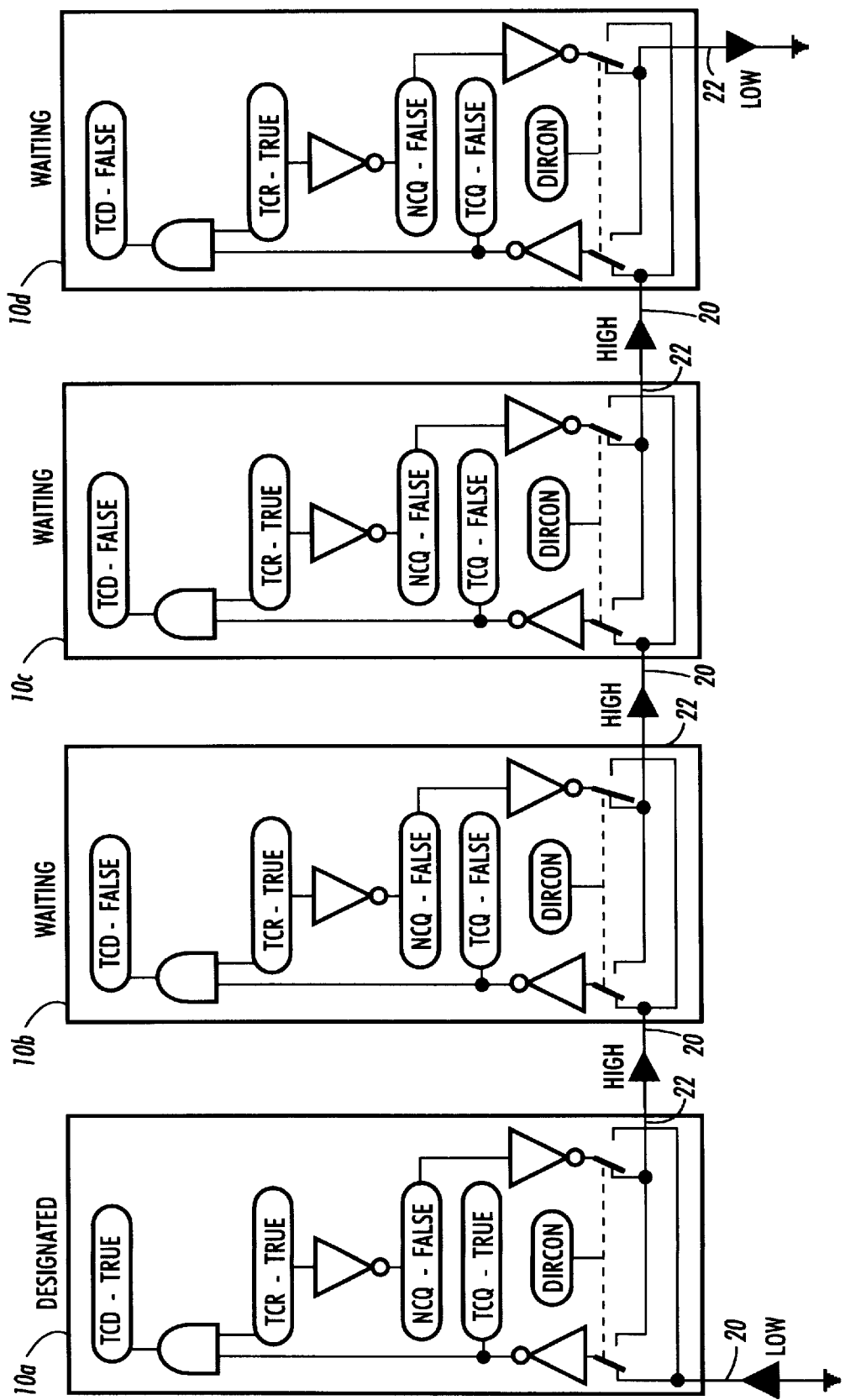

FIG. 4 depicts the aggregate condition of the same array of chips after a configuration write operation has been asserted via a mutual bus, and an array restart has been issued. The direction controls of the chips have been expediently programmed to the desired logic level by the single global configuration write operation due to the free access attribute of the configuration register of each like chip. Within the example chip of FIG. 2, the action of writing to the configuration register simultaneously sets the internal chip readiness element of the chip to the ready state, as was previously explained; therefore, to an array of such chips, the issuance of an array restart occurs as an inseparable result of a configuration write operation. The independently accessible elements of the array are now ready to be interacted with, one chip at a time.

The direction controls have been programmed in this example such that the left qualification pads are serving as the acting qualification inputs and the right qualification pads are serving as the acting qualification outputs; therefore the designation sequence will progress in a rightward direction.

The leftmost chip 10a is solely designated for interaction immediately after issuing the array restart, because its left qualification pad is permanently tied to digital ground (logic low) and because it has been made ready by the restart. Chip 2 10b, though it was also made ready by the restart, is not designated for interaction because its left qualification pad 20 is being held to a logic high by right qualification pad 22 of Chip 1 10a. The other chips, which were also made ready by the restart, are not designated for interaction, because their left qualification pads are being held high by the ready state of their predecessor chips, as represented by a high on a predecessor chip's right qualification pad. When all required interactions with the independently accessible elements of the presently designated chip are completed, a commanded token pass may be externally actuated by the incorporating system.

Figure 5:
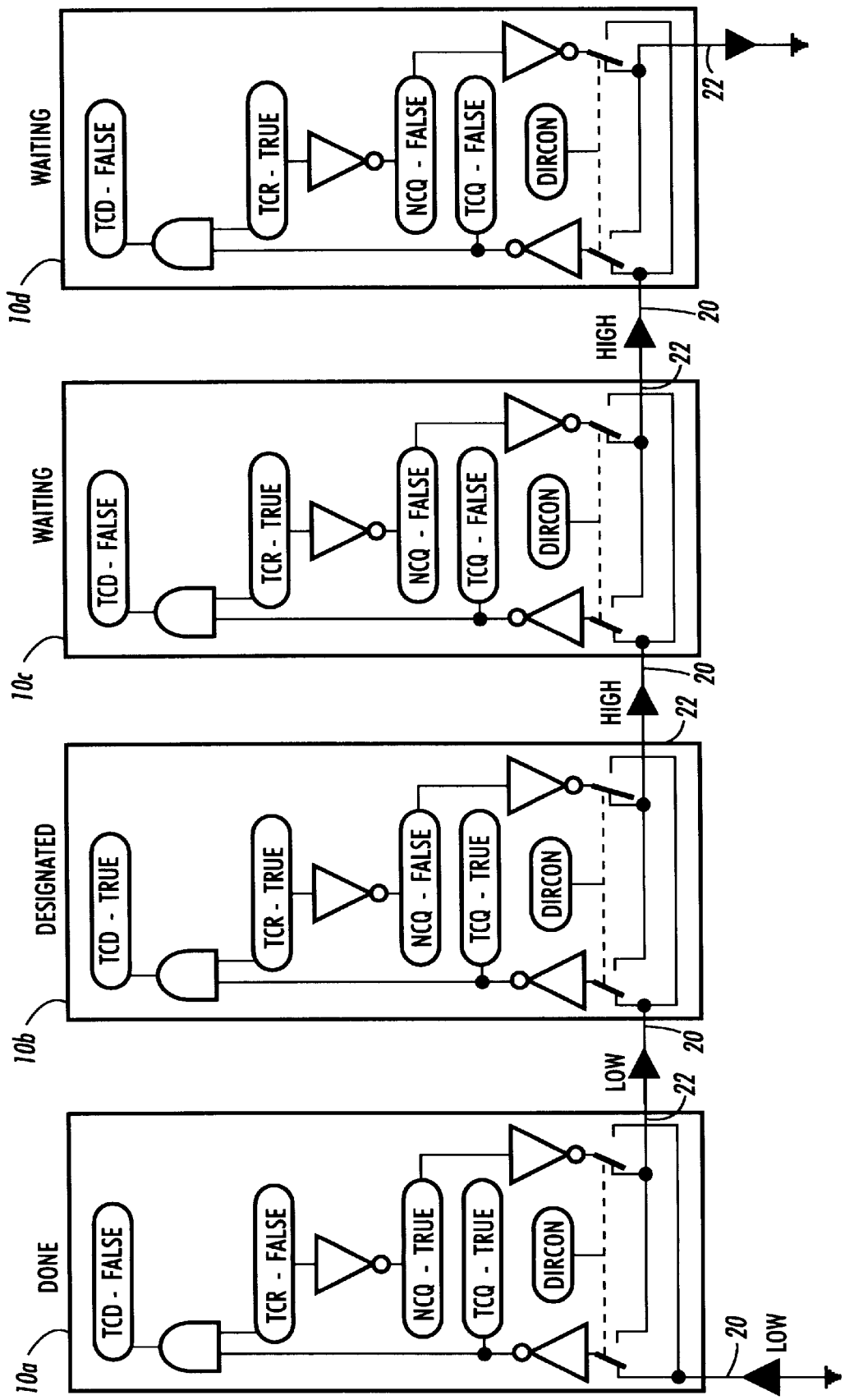

FIG. 5 depicts the aggregate condition of the array of chips after a single token pass causes the chip readiness element of Chip 1 10a to drop out of the ready state and thus this chip attains a done status and drives its right qualification pad 22 low. Its successor chip 10b, whose chip readiness element was initially set to the ready state by the array restart and is still in the ready state, immediately becomes the solely designated chip upon discerning the low logic level at its left qualification pad 20.

Figure 6:
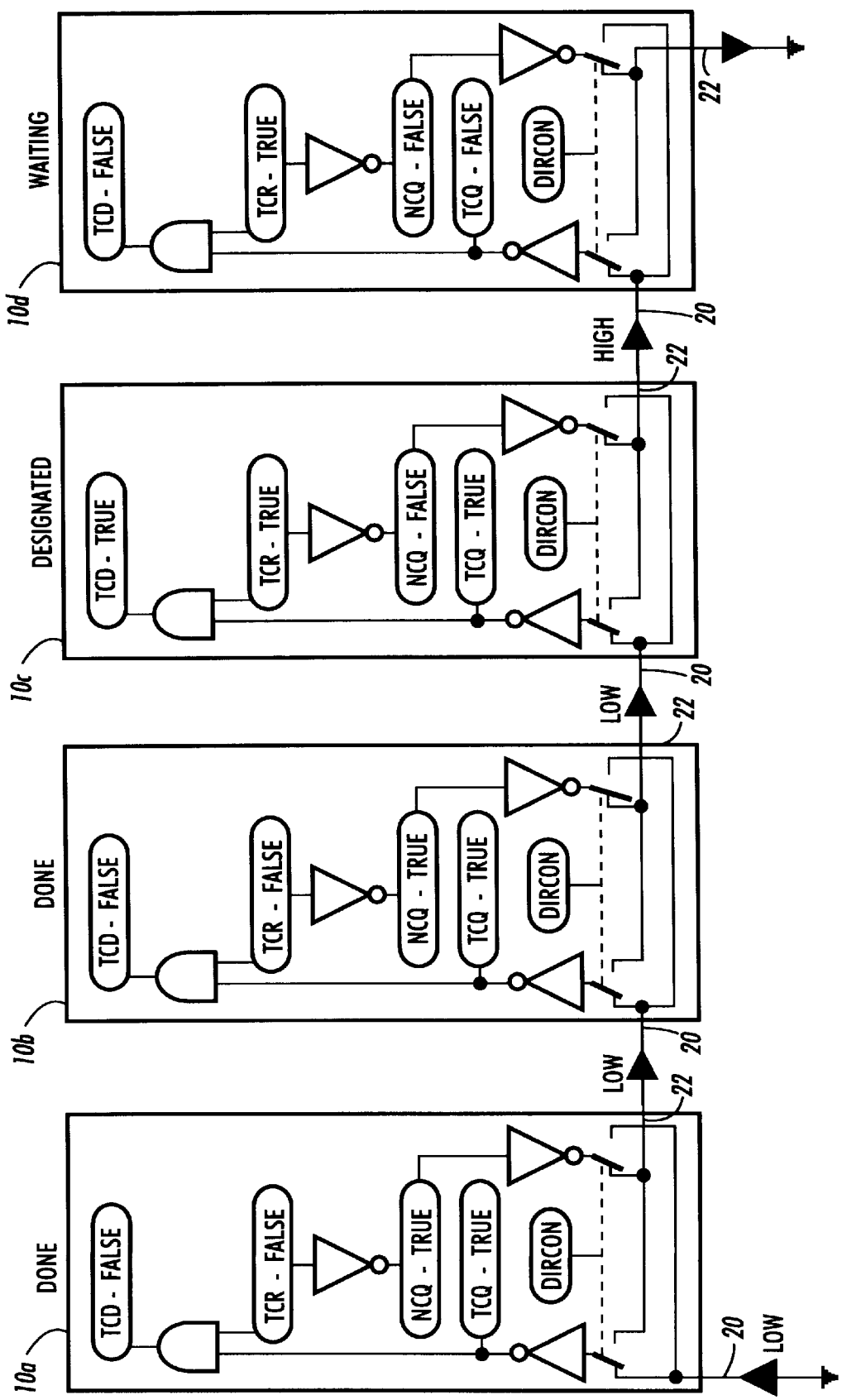

FIG. 6 depicts the aggregate condition of the array of chips after a subsequent token pass causes Chip 3 10c to become solely designated in exactly the same way as was described for Chip 2 10b. The designation token is passed from chip to chip in this way until the final chip in an array becomes designated. After all required interactions with the final chip, a restart would typically be issued.

Note that if an additional and optional token pass causes the final chip to drop out of the ready state before the next restart is issued, it would attain a done status and its acting output qualification pad would harmlessly drive a low into ground. The electrical current of the high logic level which that pad was previously driving into ground is safely limited as is explained below.

Figure 7:
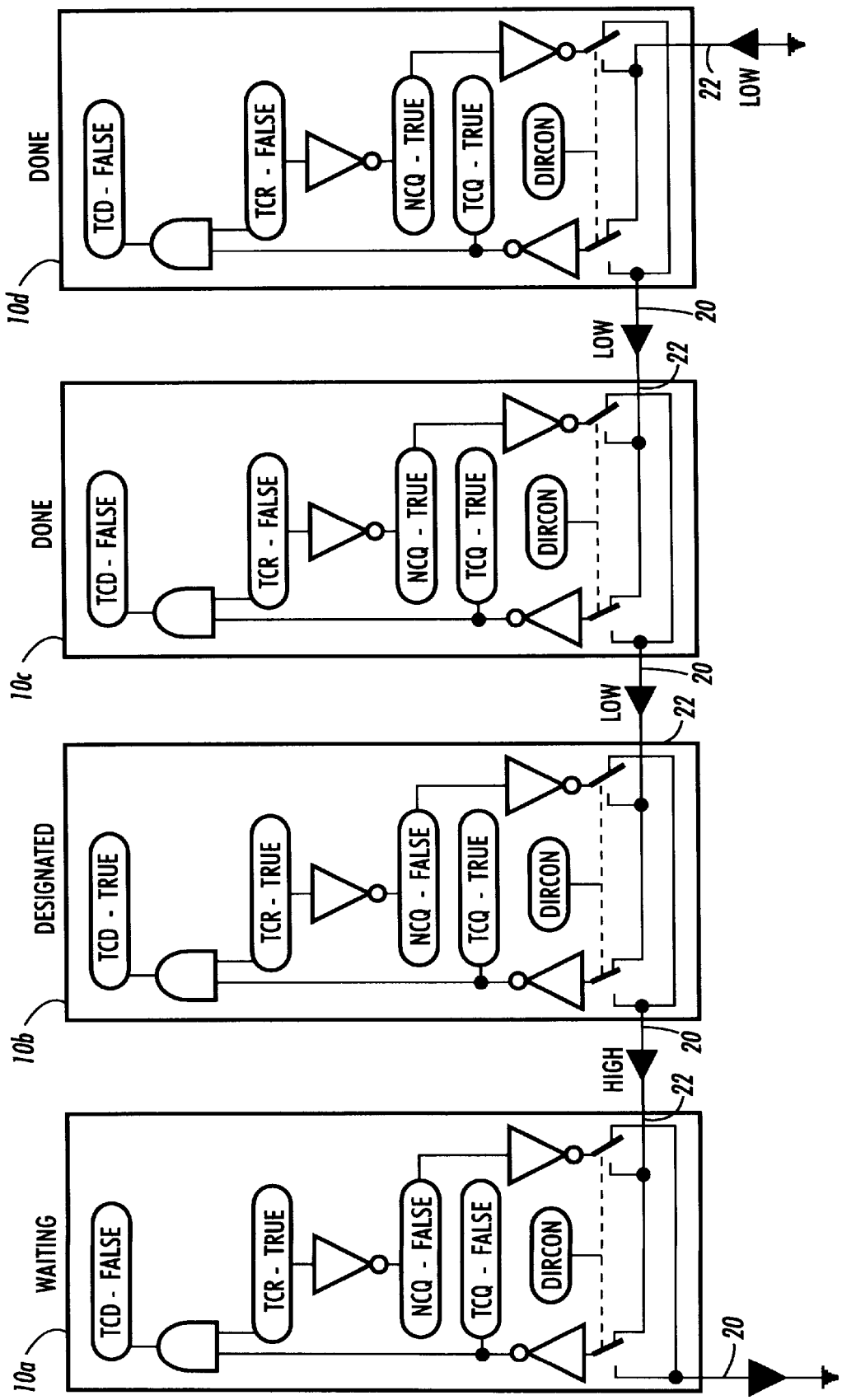

FIG. 7 depicts the array of chips after their direction controls have been globally programmed to cause their right qualification pads 22 to serve as acting qualification input, and their left qualification pads 20 to serve as acting qualification output. As an arbitrary example, the depicted aggregate condition of the array demonstrates the result of a restart and then a series of two token passes, such that Chip 2 10b is solely designated. The process occurs in the same manner as was demonstrated by FIGS. 4 through 6, except that in this case Chip 4 10d was initially caused to be the solely designated chip after a restart, and the subsequent designation sequence progresses in a leftward direction.

For the sake of further understanding, an invalid condition involving one or more member chips could occur, but would be an indication of a hard or a soft failure or the result of the previously described directional chaos condition. An invalid chip status would be indicated when the readiness element of a chip is the done state and its acting qualification input pad is receiving non-qualification. Without qualification, a chip could not have validly participated in any operation which would have caused its readiness element to drop out of the ready state.

Figure 8:
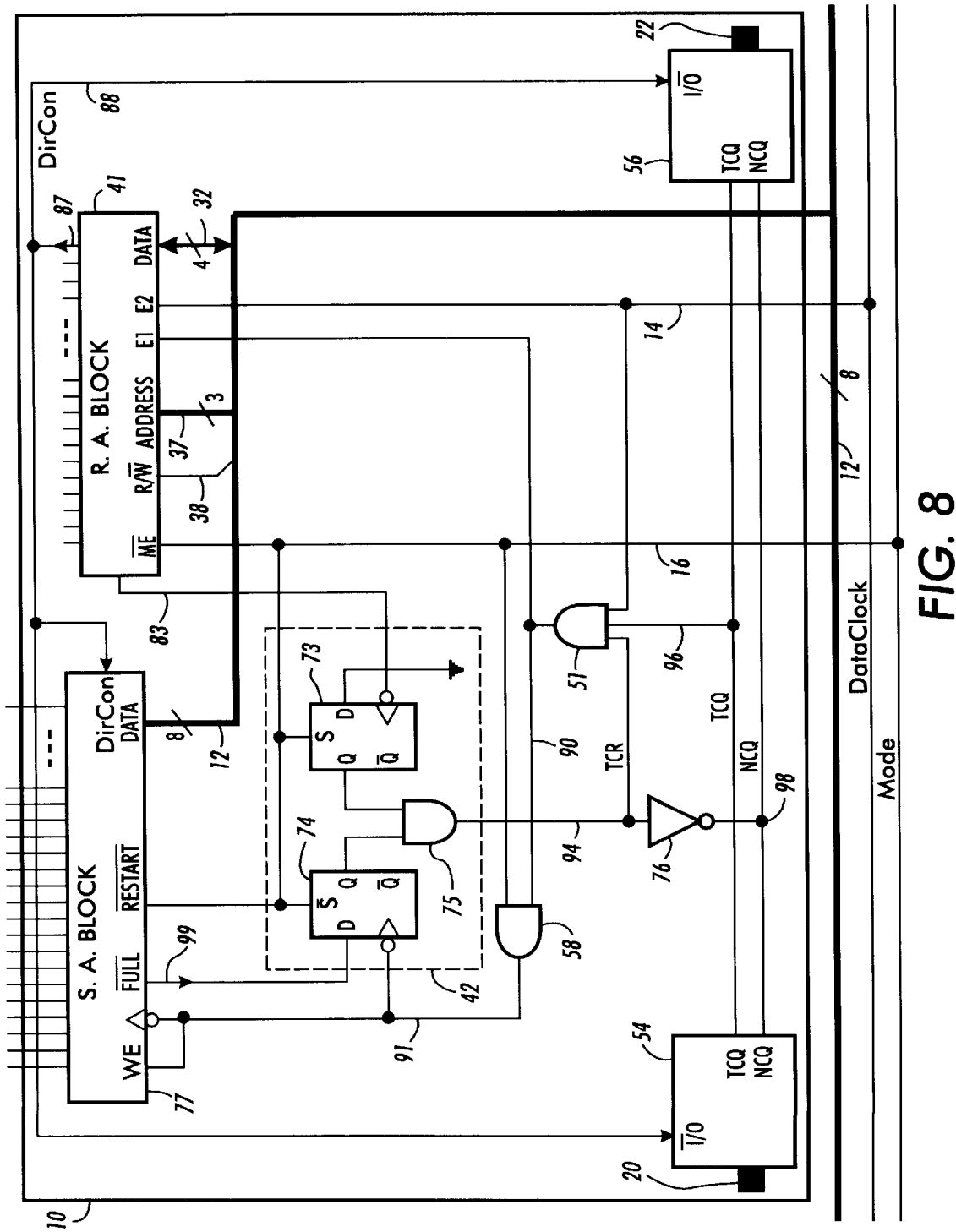
FIG. 8 is a simplified logic diagram of an example chip which has two chip interaction modes and incorporates an extended embodiment of this invention.

FIG. 8 is a simplified schematic diagram which exemplifies the added parts of a more complex chip which extend the utilization of the invention. The interface details of this example chip are what is represented in the block diagram of FIG. 1, because it contains additional functional attributes which are preferred within the print-bar environment.

This chip contains all of the registers which were depicted in FIG. 2 within a R.A. (random address) block 41, and they are four bits wide as an example. This chip adds a set of registers within the depicted S.A. (sequential address) block 77, and which are eight bits wide in this example. A Mode control input 16 is added and its logic level determines whether interaction with the chip 10 is directed to the R.A. block 41, which includes decoding for the previously described commanded token passing function; or whether data will be written to the sequentially addressed register set, which automatically actuates a token pass at completion. The advantage of adding a mode of operation which uses an internally generated sequential addressing method is that certain types of data which are typically sequentially arranged, such as video data, may be written without the need for external addressing inputs. The addressing function of the dedicated addressing inputs which were used to target the randomly addressable registers of the example chip of FIG. 2, is instead incorporated as secondary functions of pads which normally serve as data pads when the chip is operating in this efficient performance mode. Data throughput is thus increased without adding more dedicated bonding pads and wiring.

When the Mode control line 16 is held at a high logic level this example chip 10 is put in the performance mode and data is written to the eight bit sequentially addressed register set by using the entire width of the eight bit bus 12 to convey the data. when the Mode control line is held low, this chip is in an accessory mode and is interacted with as was described regarding the chip of FIG. 2. In this accessory mode, data is directed to the four bit randomly addressable register set of the R.A. block 41 by using a four bit portion of the bus 32 to convey data and a three bit portion of the bus 37 to convey the addressing codes. Also, when in this mode, the data portion of the bus 32 gains I/O capability, and the one remaining bit of the bus 38 is used as a read/write control and hence determines the I/O status of the data portion of the bus 32.

The relationship between the performance mode of this chip to the invention, is that the randomly addressable and freely accessible configuration register which resides within the R.A. block 41, and contains the direction control bit, determines the token passing direction of the chip when it is operating in the performance mode as well as when it is being interacted with in the accessory mode. Because the mutual internal direction control can only be programmed by the methods reliably facilitated by this invention as previously described and accessed when this chip is in its accessory mode; the workings of this chip when in its performance mode, are dependant upon this invention.

In this diagram of FIG. 8, the decoding logic of FIG. 2 is contained within the R.A. block 41. The E1 90 and E2 14 inputs and the direction control output 87 and one of the decoder outputs 83 all retain their previous functional bearing. The internal logic of this block increases functionality in the following ways. An ME-bar input which is a constituent of the Mode control 16 is added, and provides a master enable function which either enables or disables all interactions with this block 41. Readback from the internal registers is an added capability and causes the four bit data portion of the bus 32 to serve as an I/O conveyance medium. An R/W-bar input 38, which is a read/write control, is added. One more addressing input is added, such that there are three acting addressing inputs 37 in this example embodiment and thus there are eight available target addresses within this R.A. block.

When the Mode control 16 and the single bus node 38, of which the R/W-bar input is a constituent, are both held low, the configuration register, which contains the direction control bit, and the other registers within this enhanced block 41 may be addressed and written to exactly as in the chip of FIG. 2. Note that the configuration register is, as before, a free access element because the E2 input remains a direct constituent of the DataClock 14. The other internal registers and Flip-Flop 73 (via decode node 83) are independent access elements because the clocking of the E1 input 90 continues to be determined by the designation status of this enhanced chip as determined by its ready and qualification states both being true.

When the Mode control 16 is held low and R/W-bar node 38 is held high, any one of the registers within the R.A. block 41 of the designated chip may be read back from its target address when E1 90 is caused to go high. Note that this also applies to the configuration register and thus it becomes an independent access element during readback. It will be appreciated that global read operations are undesirable because a mass bus contention would result if an array of such bussed chips globally responded to an asserted read request.

A void target address is useful and is accommodated within this block 41. This is facilitated by leaving at least one target address unused and designing the internal decoding logic such that this unused address is not a ghost address of any existing register or function. As an explanation of this point, address decoding in systems where there is unused address space is often designed with the least possible gating such that some addressing nodes exhibit a "don't care" contribution to the selection of some target addresses. This causes those target addresses to be selected by a plurality of addressing codes. One of the addressing codes is published, and the redundant addressing codes are often referred to as ghost addresses, which are harmless within typical applications. The advantage of accommodating a truly void target address can be appreciated by considering that the two chained and bussed arrays of chips of FIG. 1 share the same DataClock line 14 for wiring efficiency reasons. When the incorporating system asserts the void target's addressing code on the mutual bus 12 or 12' of one of the arrays, it may then interact with the other array without disturbing the first array. This is a useful feature for the print-bar application.

The S.A. block 77 contains the set of registers which are written sequentially over the entire width of the bus 12 as previously described. The sequential addressing of these registers is internally generated within the block and can be accomplished by an internal token passing chain or by a counter and decoder. All writing to these registers is conditional as determined by the designation status of the chip. Where the designation status allows the clocking of node 90, AND-gate 58 can be seen to pass this clocking to the S.A. block 77 via node 91 when the Mode control 16 is held high. The direction control, in this embodiment, also determines whether the sequentially addressed registers are written in a rightward or leftward internal sequential progression from the chip perspective through the use of a direction control input to the S.A. block 77 which is a constituent of the direction control node 88. This input is used to control the direction of an internal bidirectional token passing chain, or whether the counter of a counter and decoder combination counts up or down; depending upon the preferred embodiment of the block.

The chip readiness block 42 of this embodiment contains two D-type flip-flops. Flip-flop 73 continues to serve the commanded token pass function for the accessory mode by transitioning its Q output to a low level in response to a falling edge on decode node 83. Flip-flop 74 serves the performance mode by transitioning its Q output to a low level in response to a falling edge of node 91 after node 99 is driven and held to a low level by the constituent FULL-bar output of the S.A. Registers block 77. In this example embodiment, the FULL-bar output is driven low when the final sequential register is written and hence an automatic token pass is caused by this event. Because the S input of flip-flop 73 and the S-bar input of flip-flop 74 are both constituents of the Mode control 16, the Q output of one or the other of these flip-flops is being forced to a high level at any given time. Thus the TCR node 94, which is driven by the output of AND-gate 75, will always confer the readiness state of the particular flip-flop, 73 or 74, which corresponds to the interaction mode at hand, and which is free to transition.

The logic level of the Mode control 16 determines, as previously explained, whether subsequent interactions which are completed by DataClock pulses will be directed to the R.A. block 41, or to the S.A. block 77. Immediately after the logic level of the Mode control 16 is changed, the chip will be in the ready state because the state of the flip-flop which corresponds to the new mode will have just previously been forced true, as described above. Thus when the chip is in the accessory mode, a high going pulse on the Mode control 16 in the absence of activity on the DataClock 14 is used to cause the chip to go to the ready state for that mode. Likewise, when the chip is in the performance mode, a low going pulse on the Mode control 16 in the absence of activity on the DataClock 14 is used to cause the chip to go to the ready state for that mode, and to also zero the address sequencer within the S.A. block 77, via its RESTART-bar input.

When, therefore, these example chips of FIG. 8, are incorporated into chained and bussed arrays, such as represented within the print-bar of FIG. 1, a high or a low pulse of the Mode control line 16 in the absence of DataClock activity, will cause all chips to be simultaneously set to the ready state. Accordingly, this simple action becomes the method of issuing the previously explained array restart function for arrays of these enhanced chips. It can thus be appreciated that the Mode control line 16 of this example embodiment provides four (4) functions within the array context. These functions are: determination of interaction mode, restart of the designation sequence for the accessory mode, restart of the designation sequence for the performance mode, and simultaneous re-initialization of the internal address sequencers of all member chips for the performance mode. The multiple purpose capability of this single Mode control line 16 is conducive to efficient wiring which is extremely desirable on a print-bar.

Figure 9:
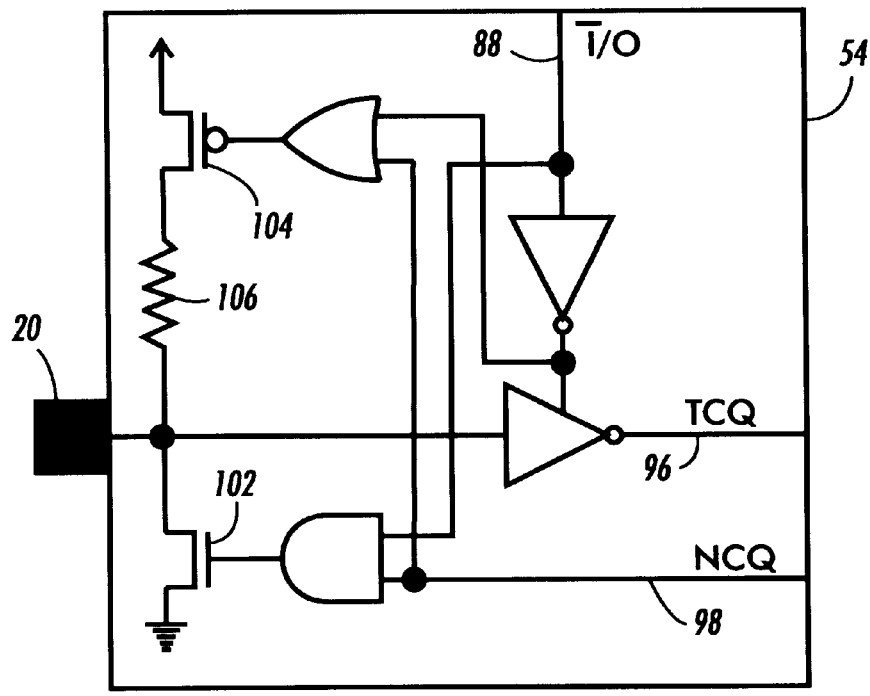
FIGS. 9 and 10 depict example embodiments of the qualification pad circuits which are employed within the chips of FIGS. 2 and 8.
Figure 10:
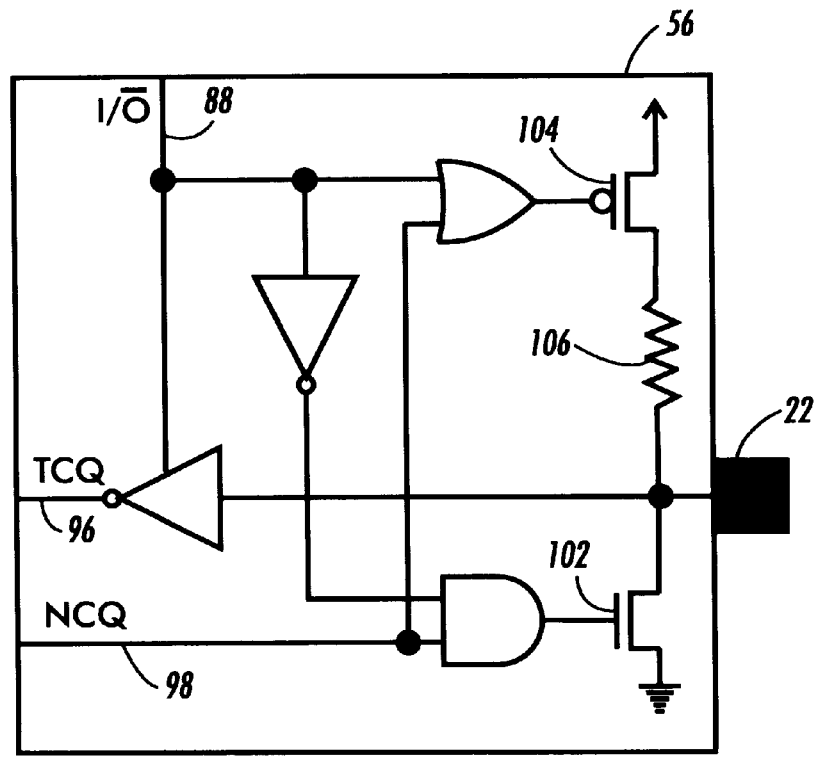

FIGS. 9 and 10 depict example embodiments of the left and right qualification pad circuits 54 and 56 as employed within the chips of FIGS. 2 and 8, and whose fundamental operation was described regarding FIG. 2. These qualification pad circuits are designed to limit output vs. output contention currents to a non-destructive and non-stressful value during a directional chaos condition such as depicted in FIG. 3, or when driving a logic high into ground as was mentioned above. They do so without degrading the data transfer rate when the array is in normal operation as explained below.

Resistor 106 is connected between the P-channel MOS transistor 104 and the qualification pad 20 or 22, and thus the high level drive current through these pads is safely limited. As used within the example chips of FIGS. 2 and 8, these qualification pads are required to transition to a high logic level at the issuance of an array restart. The low to high transition time which is determined by the resulting RC time constant of the resistor 106 and the qualification pad 20 or 22 and external bonding wire is not critical because all such chained and bussed chips transition simultaneously at each restart, and hence the RC delays are not cumulative.

Sequential data writing into an array of chips—as efficiently facilitated by the performance mode of the chip depicted in FIG. 8, where token passing is automatic—is ideally performed as one seamless sequence at the highest possible data transfer rate. The transition from high to low which occurs during token passing is driven directly by the N-channel MOS transistor 102 within this embodiment, and thus is relatively fast. This minimizes the impact of token passing propagation speed. The high to low transition is preferred for quickly relaying a token pass because N-channel MOS transistors can deliver more current per unit area (size) than can their P-channel counterparts.

It should be readily apparent that the present invention can be embodied such that the hereinbefore described elements which exists within a single exemplified chip are instead incorporated within a printed circuit board, or any electronic device.

The use of this invention in the implementation of an operationally seamless array-wide bidirectional token passing chain which includes multiple stages within each device, and passes through device boundaries, can be seen to have been actually taught hereinbefore when it is considered that the addressing of the sequentially addressed registers of the chip of FIG. 8 can be accomplished by an internal bidirectional token passing chain, as was explained.

The use of this invention in the implementation of an optimized hybridization of an internal bidirectional token passing chain and an addressing bus scheme within a single device—such that one internal collection of elements can be designated, and then each single element from within that designated collection becomes addressable by way of the internal address bus—can be seen to have been actually taught herein and can be abstractly recognized by viewing an exemplified array with mentally removed subboundaries. Consider that each of the chips of an array is actually a collection of elements, with each such collection being designatable by token passing, and with some of the elements within each collection being taught to be randomly addressable by way of an addressing bus (herein depicted as an unnamed portion of a bus) which is mutual to the plurality of collections.

It will be appreciated that the present invention can be applied within many systems which require coordinated interaction with inversely oriented rows, as demonstrated herein; or any place where the disclosed teachings would provide an optimized compromise between performance concerns and wiring concerns within a system which requires a reversible interaction sequence with its incorporated devices.

Further, many changes could be made to the disclosed embodiments, and some of those changes are contemplated as follows. Either state of the direction control element could be latched by assertion of respective target addresses alone, without using a data bit. Many more internal registers or elements than demonstrated by the disclosed examples can be accommodated by extrapolating upon the extensiveness of the depicted address decoding logic. A plurality of free access registers or elements can easily be facilitated by modifying the decoding logic of the devices. Addressed elements might be other than storage elements, such as LEDs connected to output terminals which are caused to illuminate as a direct response to asserted target addresses, or to address and data combinations. The designation logic which is internal to each device could be used to permit the independent reading of data from any source which is located within or presented to other pads of a designated device. Devices can be designed such that any reasonable external assertion applied to both the data and address pads are decoded in combination to actuate the commanded token passing function or the array restart function. Any internal event occurring within a device could be made to actuate the automatic token passing function. Various logic designs and methods, controllable by the internal direction control state, may be used for receiving and passing a designation token from device to device.

It must be understood that many alterations and modifications can be made by those having ordinary skill in the art to the configuration and circuits of the present invention without departing from the spirit and scope of the invention. Therefore, the present embodiments have been shown only by way of example and for the purpose of clarity and should not be taken to limit the scope of the following claims.

What is claimed is:

1. A system for using bus means for interacting with locations within a plurality of connected devices, each device comprising:

a direction control storage element for storing a direction control state from said bus means, and which is responsive to a particular state of said bus means;

first and second terminals for coupling a token between each said device and a subsequent device;

data storage means for storing data from said bus means; and logic means responsive to the token coupled in from said first terminal and to the direction control state so as to enable said data storage means to input data from said bus means or to output data to said bus means, and to couple the token out of said second terminal to a subsequent device in a direction determined by the direction control state.

2. The system of claim 1 wherein said direction control storage element of all of the devices connected to said bus means is capable of being simultaneously programmed with data from said bus means, but only the data storage means of the device possessing the token is able to input or output data from or to said bus means.

3. A system for allowing the application of individual stimuli to independently responsive elements which are located within a plurality of devices which are connected to bus means, wherein said independently responsive elements are responsive to states of said bus means; the system comprising:

daisy chain means for coupling said plurality of devices and which is used for sequentially designating each of said devices one at a time by serving as a medium for passing a token from device to device;

a plurality of direction control storage elements, each of which is located within each of said devices, and whereby said direction control storage elements are responsive to particular states of said bus means such that they will all be latched to identical states and then used to determine the direction which the token is passed; and logic means, located within each of said devices for applying the stimuli to said independently responsive elements, said logic means being responsive to a composite state which includes:

presence of the token within the device; and states of said bus means;

and whereby said logic means passes the token out to a subsequent device in a direction determined by the state of said direction control storage element.

4. The system of claim 3 wherein said independently responsive elements are able to store states determined by data presented to said bus means, as a response to said stimuli.

5. The system of claim 3 wherein said logic means of the device possessing the token is responsive to a particular state of said bus means for passing the token out to a subsequent device.

6. The system of claim 3 comprising a data clock line connected to all of the devices of the system and which is used for completing the actualization of responses within the devices of the system; and wherein said bus means is divided into a plurality of distinct divisions whereby the devices are grouped into device groups such that each device group is connected to a different division of said bus means; and said daisy chain means is divided into a plurality of distinct divisions, such that each device group is connected to a different division of said daisy chain means; and whereby a void addressing state is capable of being applied to some of the divisions of said bus means such that the devices which are connected to the divisions to which said void addressing state is applied are nonresponsive when a particular state of said data clock line is used to actuate a response within the devices groups which are connected to other divisions of said bus means.

7. A device comprising:

comprehensive terminal means for selecting locations of elements within the device, and for transferring data into and out of the device;

two qualification terminals, either one of which is able to serve as an acting qualification input;

a direction control storage element for storing a direction control state which establishes which one of said qualification terminals is, at a particular time, serving as the acting qualification input, whereby said direction control storage element is responsive to:

states of said comprehensive terminal means; and an independently responsive element, for storing or inputting data, which is responsive to a composite state which includes:

a particular state of the acting qualification input.

8. The device of claim 7 wherein said independently responsive element stores a state determined by data presented to said comprehensive terminal means.

9. The device of claim 7 wherein said independently responsive element is responsive to a composite state which includes:

a particular state of the acting qualification input; and states of said comprehensive terminal means.

10. The device of claim 7 comprising internally generated addressing means and wherein said independently responsive element is responsive to a composite state which includes:

a particular state of the acting qualification input; and states of said internally generated addressing means.

11. The device of claim 10 comprising a mode control terminal for putting the device in an alternate mode of operation, whereby said comprehensive terminal means serve exclusively as means for transferring data into and out of the device.

12. The device of claim 7 comprising a device readiness storage element for storing a device readiness state, and wherein said independently responsive element is responsive to a composite state which includes:

a particular state of the acting qualification input; and a first state of said device readiness storage element which denotes a device ready state.

13. The device of claim 12 wherein said independently responsive element stores a state determined by data presented to said comprehensive terminal means.

14. The device of claim 12 wherein said independently responsive element is responsive to a composite state which includes:

a particular state of the acting qualification input;

the device ready state; and states of said comprehensive terminal means.

15. The device of claim 12 comprising internally generated addressing means and wherein said independently responsive element is responsive to a composite state which includes:

a particular state of the acting qualification input;

the device ready state; and states of said internally generated addressing means.

16. The device of claim 15 comprising a mode control terminal for putting the device in an alternate mode of operation, whereby said comprehensive terminal means serve exclusively as means for transferring data into and out of the device.

17. The device of claim 12, wherein the device ready state is actuatable by:

a particular state of said comprehensive terminal means.

18. The device of claim 12, wherein a second state of said device readiness storage element, which denotes a device done state is actuatable by a composite state which includes:

a particular state of said qualification terminal means; and a particular state of said comprehensive terminal means.

19. The device of claim 12, wherein a second state of said device readiness storage element, which denotes a device done state is actuatable by a composite state which includes:

a particular state of said qualification terminal means; and a particular state of an internally generated addressing means.

20. The device of claim 12 wherein the one of said qualification terminals which is not, at a particular time, serving as the acting qualification input conversely serves as an acting qualification output which conveys the present state of said device readiness storage element.

21. The device of claim 20 comprising electrical current limiting means such that the one of said qualification terminals which is serving as the acting qualification output provides an electrical current which is limited, by said electrical current limiting means, to a magnitude sufficient for driving a high impedance digital input but non-stressful to the device when said acting qualification output is connected to a short circuit or low impedance circuit and said acting qualification output is attempting to drive to a logic level which indicates the device ready state of said device readiness storage element; and whereby said acting qualification output provides an electrical current which is not limited to a non-stressful magnitude when attempting to drive to a second logic level which indicates a device done state of said device readiness storage element, so that the transition speed to the logic level which indicates the device done state is maximized.

* * * * *